US012396080B2

(12) United States Patent
Chang et al.

(10) Patent No.: US 12,396,080 B2
(45) Date of Patent: Aug. 19, 2025

(54) DIMMING CONTROL SYSTEM HAVING ASYNCHRONOUS PULSE WIDTH MODULATION MECHANISM

(71) Applicant: ANPEC ELECTRONICS CORPORATION, Hsinchu (TW)

(72) Inventors: Che-Chang Chang, Hsinchu County (TW); Yun-Li Liu, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 199 days.

(21) Appl. No.: 18/453,269

(22) Filed: Aug. 21, 2023

(65) Prior Publication Data

US 2024/0373528 A1 Nov. 7, 2024

(30) Foreign Application Priority Data

May 2, 2023 (TW) ................................ 112116221

(51) Int. Cl.
*H05B 45/325* (2020.01)
*H05B 45/10* (2020.01)

(52) U.S. Cl.
CPC ........... *H05B 45/325* (2020.01); *H05B 45/10* (2020.01)

(58) Field of Classification Search
None
See application file for complete search history.

(56) References Cited

U.S. PATENT DOCUMENTS

2020/0154537 A1* 5/2020 Fu ........................ H02M 3/156
2023/0199927 A1* 6/2023 Wang ..................... H05B 45/10
315/291

* cited by examiner

*Primary Examiner* — Kenneth B Wells
(74) *Attorney, Agent, or Firm* — Li & Cai Intellectual Property Office

(57) ABSTRACT

A dimming control system having an asynchronous pulse width modulation mechanism is provided. When a transition in a level of a synchronous signal meets a specified transition, a width of a pulse wave that is currently generated in a pulse width modulation signal may not reach a preset pulse width. Under this condition, the dimming control system delays generating subsequent pulse waves of the pulse width modulation signal until the width of the pulse wave that is currently generated reaches the preset pulse width. Alternatively, the dimming control system forcibly transits the pulse wave that is currently generated from a high level to a low level to stop increasing the width of the pulse wave, maintains the pulse wave as an incomplete pulse wave, and increases widths of one or more of the subsequent pulse waves of the pulse width modulation signal.

20 Claims, 7 Drawing Sheets

DIMMING CONTROL SYSTEM HAVING ASYNCHRONOUS PULSE WIDTH MODULATION MECHANISM

CROSS-REFERENCE TO RELATED PATENT APPLICATION

This application claims the benefit of priority to Taiwan Patent Application No. 112116221, filed on May 2, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a dimming control system, and more particularly to a dimming control system having an asynchronous pulse width modulation mechanism.

BACKGROUND OF THE DISCLOSURE

In recent years, light-emitting diodes (LEDs) are widely used as backlight sources in display devices. Brightnesses of LED backlight light bars of the display devices are often modulated according to pulse width modulation (PWM) signals. Duty cycles of a plurality of pulse waves of the pulse width modulation signals may be modulated to adjust on-time lengths and off-time lengths of light-emitting diodes of the LED backlight light bars so as to adjust the brightnesses of the display devices.

As shown in FIG. 7, each time when a current time reaches a time point of a rising edge of each of a plurality of waveforms of a synchronization signal SyncPRT, a conventional dimming control system modulates duty cycles of a plurality of pulse waves of a pulse width modulation signal PWMPRT to adjust a length of time during which the light-emitting diodes emit light. However, when the current time reaches a time point of a rising edge of a second one of the plurality of waveforms of the synchronization signal SyncPRT, a pulse wave PRS1 among the plurality of pulse waves of the pulse width modulation signal PWMPRT is not yet constructed to have a preset pulse width, and is thus still an incomplete pulse wave. At this time, the conventional dimming control system forcibly interrupts the construction of the pulse wave PRS1 that is still the incomplete pulse wave, and then generates subsequent pulse waves each having a next preset pulse width in the pulse width modulation signal PWMPRT, which causes flashing light to be emitted abnormally by the display device.

SUMMARY OF THE DISCLOSURE

In response to the above-referenced technical inadequacies, the present disclosure provides a dimming control system having an asynchronous pulse width modulation mechanism. The dimming control system includes a synchronous signal generator circuit, a synchronous signal detector circuit, a pulse width modulation signal generator circuit, a pulse width comparing circuit and a pulse modulation controller circuit. The synchronous signal generator circuit is configured to output a synchronous signal. The synchronous signal detector circuit is connected to the synchronous signal generator circuit. The synchronous signal detector circuit is configured to detect a level of the synchronous signal from the synchronous signal generator circuit. The pulse width modulation signal generator circuit is configured to sequentially output a plurality of pulse waves of a pulse width modulation signal over time. The pulse width comparing circuit is connected to the synchronous signal detector circuit and the pulse width modulation signal generator circuit. The pulse width comparing circuit determines whether or not a width of one of the plurality of pulse waves of the pulse width modulation signal that is generated when a transition in the level of the synchronous signal meets a specified transition, reaches a preset pulse width to output a pulse width comparing signal. The pulse modulation controller circuit is connected to the pulse width modulation signal generator circuit and the pulse width comparing circuit. The pulse modulation controller circuit determines a level and a width of each of the plurality of pulse waves of the pulse width modulation signal for controlling a lighting state of a light-emitting circuit according to the pulse width comparing signal from the pulse width comparing circuit. The pulse width modulation signal generator circuit outputs the pulse width modulation signal to the light-emitting circuit connected thereto. When the transition in the level of the synchronous signal meets the specified transition, and the width of the one of the plurality of pulse waves that is currently generated in the pulse width modulation signal does not reach the preset pulse width yet, the pulse modulation controller circuit controls the pulse width modulation signal generator circuit to delay generating subsequent ones of the plurality of pulse waves of the pulse width modulation signal until the width of the one of the plurality of pulse waves reaches the preset pulse width.

In certain embodiments, when the synchronous signal transits from a low level to a high level, the pulse modulation controller circuit determines that the transition in the level of the synchronous signal meets the specified transition.

In certain embodiments, when the synchronous signal transits from a high level to a low level, the pulse modulation controller circuit determines that the transition in the level of the synchronous signal meets the specified transition.

In certain embodiments, when the synchronous signal transits from a low level to a high level or from the high level to the low level, the pulse modulation controller circuit determines that the transition in the level of the synchronous signal meets the specified transition.

In certain embodiments, the pulse width modulation signal generator circuit generates the plurality of pulse waves of the pulse width modulation signal respectively within a plurality of time intervals. The pulse width modulation signal generator circuit adjusts the preset pulse width over time according to lighting request information of the light-emitting circuit such that the preset pulse width has different values respectively within the plurality of time intervals. Each of the plurality of pulse waves of the pulse width modulation signal and the preset pulse width that are generated within a same one of the plurality of time intervals are compared with each other by the pulse width comparing circuit.

In certain embodiments, the synchronous signal generator circuit generates a plurality of waveforms having different frequencies in the synchronous signal according to lighting request information of the light-emitting circuit.

In certain embodiments, the pulse width modulation signal generator circuit sets the preset pulse width to have different values respectively within a plurality of lighting control time intervals. Each of the plurality of lighting control time intervals is between a transition time point of one of a plurality of waveforms of the synchronous signal and a transition time point of a next one of the plurality of waveforms of the synchronous signal.

In certain embodiments, when a current time falls within one of the plurality of lighting control time intervals and a width of one of the plurality of pulse waves of the pulse width modulation signal that starts being increased from a previous one of the plurality of lighting control time intervals does not reach the preset pulse wave of the previous one of the plurality of lighting control time intervals, the pulse width modulation signal generator circuit continually increases the width of the one of the plurality of pulse waves until reaching the preset pulse wave of the previous one of the plurality of lighting control time intervals.

In addition, the present disclosure provides a dimming control system having an asynchronous pulse width modulation mechanism. The dimming control system includes a synchronous signal generator circuit, a synchronous signal detector circuit, a pulse width modulation signal generator circuit, a pulse width comparing circuit and a pulse modulation controller circuit. The synchronous signal generator circuit is configured to output a synchronous signal. The synchronous signal detector circuit is connected to the synchronous signal generator circuit. The synchronous signal detector circuit is configured to detect a level of the synchronous signal from the synchronous signal generator circuit. The pulse width modulation signal generator circuit is configured to sequentially output a plurality of pulse waves of a pulse width modulation signal over time. The pulse width comparing circuit is connected to the synchronous signal detector circuit and the pulse width modulation signal generator circuit. The pulse width comparing circuit determines whether or not a width of one of the plurality of pulse waves of the pulse width modulation signal that is generated when a transition in the level of the synchronous signal meets a specified transition reaches a preset pulse width to output a pulse width comparing signal. The pulse modulation controller circuit is connected to the pulse width modulation signal generator circuit and the pulse width comparing circuit. The pulse modulation controller circuit determines a level and a width of each of the plurality of pulse waves of the pulse width modulation signal for controlling a lighting state of a light-emitting circuit according to the pulse width comparing signal. The pulse width modulation signal generator circuit outputs the pulse width modulation signal to the light-emitting circuit connected thereto. When the transition in the level of the synchronous signal meets the specified transition and the width of the one of the plurality of pulse waves that is currently generated in the pulse width modulation signal does not reach the preset pulse width yet, the pulse modulation controller circuit controls the pulse width modulation signal generator circuit to forcibly transit the one of the plurality of pulse waves from a high level to a low level so as to stop increasing the width of the one of the plurality of pulse waves, to maintain the one of the plurality of pulse waves as an incomplete pulse wave, and to modulate the widths of one or more subsequent ones of the plurality of pulse waves of the pulse width modulation signal to be larger than the preset pulse width of the one or more subsequent ones of the plurality of pulse waves.

In certain embodiments, when the synchronous signal transits from a low level to a high level, the pulse modulation controller circuit determines that the transition in the level of the synchronous signal meets the specified transition.

In certain embodiments, when the synchronous signal transits from a high level to a low level, the pulse modulation controller circuit determines that the transition in the level of the synchronous signal meets the specified transition.

In certain embodiments, when the synchronous signal transits from a low level to a high level or from the high level to the low level, the pulse modulation controller circuit determines that the transition in the level of the synchronous signal meets the specified transition.

In certain embodiments, the synchronous signal generator circuit generates a plurality of waveforms having different frequencies in the synchronous signal according to lighting request information of the light-emitting circuit.

In certain embodiments, the pulse width modulation signal generator circuit generates the plurality of pulse waves of the pulse width modulation signal respectively within a plurality of time intervals. The pulse width modulation signal generator circuit adjusts the preset pulse width over time, such that the preset pulse width has different values respectively within the plurality of time intervals according to lighting request information of the light-emitting circuit. The pulse width comparing circuit compares the plurality of pulse waves respectively with the different values of the preset pulse width.

In certain embodiments, the pulse width comparing circuit calculates a difference between the width of the incomplete pulse wave of the pulse width modulation signal and the preset pulse width. The pulse modulation controller circuit, according to the difference, determines to control the synchronous signal generator circuit to modulate which one or more of the plurality of pulse waves that are generated later than the incomplete pulse wave in the pulse width modulation signal, and determines target widths of the one or more of the plurality of pulse waves.

In certain embodiments, the pulse modulation controller circuit controls the synchronous signal generator circuit to modulate working periods of one or more of the plurality of pulse waves that are generated later than the incomplete pulse wave in the width modulation signal to be larger than a preset working period, and to reduce non-working periods of the one or more of the pulse waves, such that each of frequencies of the one or more of the plurality of pulse waves is equal to a preset frequency.

In certain embodiments, the pulse width modulation signal generator circuit sets the preset pulse width to have different values respectively within a plurality of lighting control time intervals according to lighting request information of the light-emitting circuit. Each of the plurality of lighting control time intervals is between a transition time point of one of a plurality of waveforms of the synchronous signal and a transition time point of a next one of the plurality of waveforms of the synchronous signal.

In certain embodiments, a falling edge of the incomplete pulse wave of the pulse width modulation signal is aligned with a rising edge of one of a plurality of waveforms of the synchronous signal.

In certain embodiments, a falling edge of the incomplete pulse wave of the pulse width modulation signal is aligned with a falling edge of one of a plurality of waveforms of the synchronous signal.

In certain embodiments, a falling edge of the incomplete pulse wave of the pulse width modulation signal is aligned with a rising edge or a falling edge of one of a plurality of waveforms of the synchronous signal.

As described above, the present disclosure provides the dimming control system having the asynchronous pulse width modulation mechanism. Each time when the transition in the level of the synchronous signal meets the specified transition (for example, from the low level to the high level), a time point at which a lighting state of the light-emitting circuit is adjusted is reached. At this time, the dimming control system of the present disclosure appropriately modulates the widths of the pulse waves of the pulse width modulation signal to prevent unexpected conditions such as abnormal flashing from occurring in the light-emitting circuit that operates according to the pulse width modulation signal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
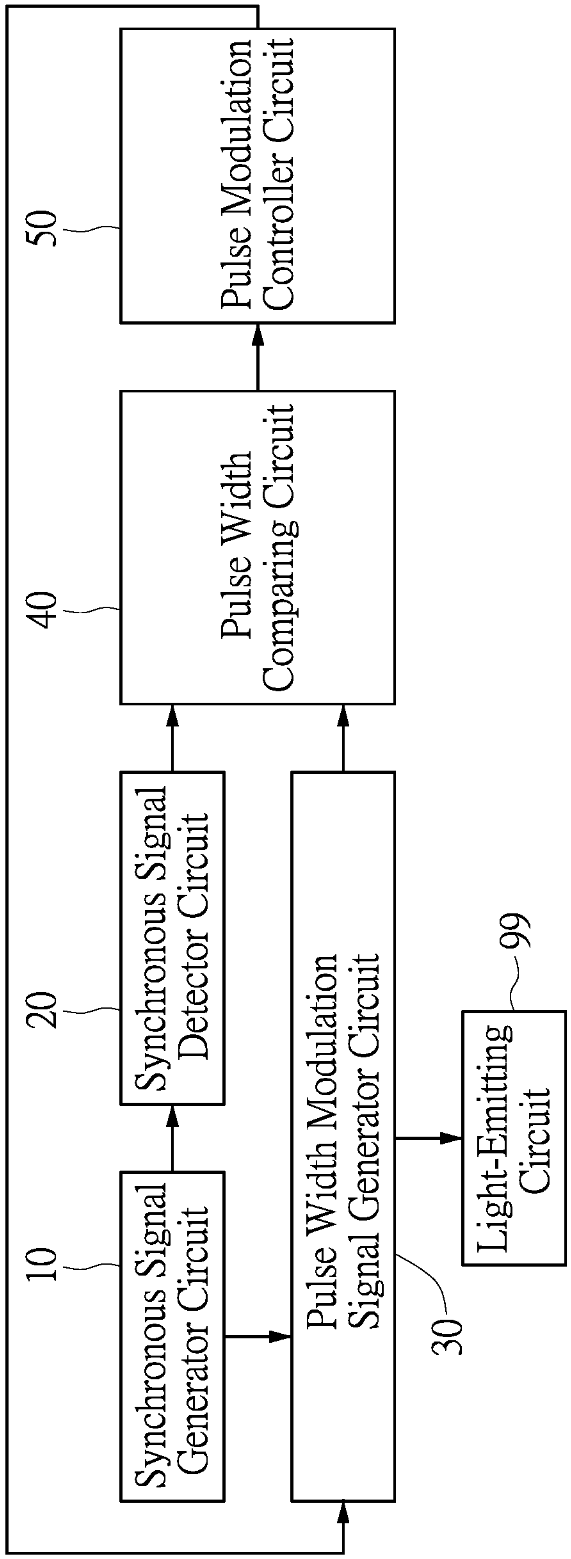
FIG. 1 is a block diagram of a dimming control system having an asynchronous pulse width modulation mechanism according to first to third embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
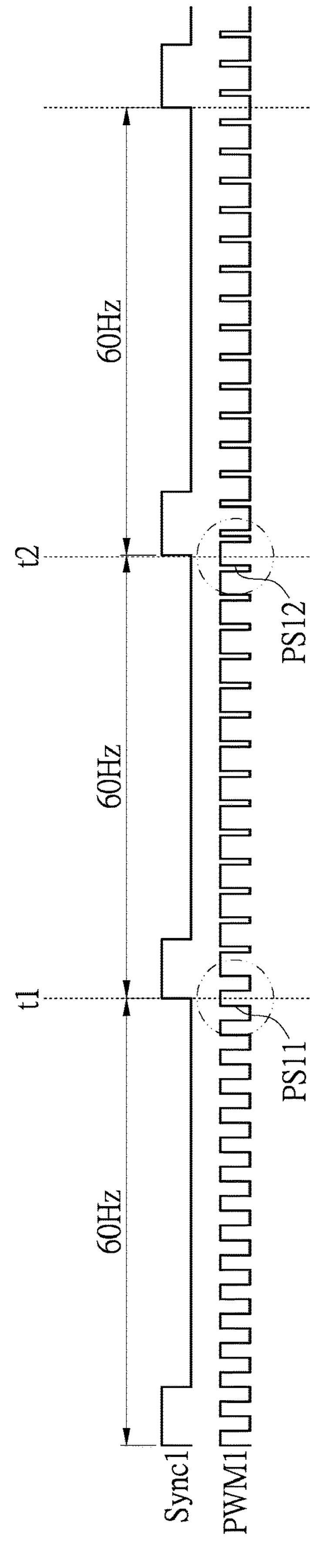
FIG. 2 is a waveform diagram of an asynchronous signal having a fixed frequency and a pulse width modulation signal that are generated by the dimming control system having the asynchronous pulse width modulation mechanism according to the first embodiment of the present disclosure.

Reference is made to FIGS. 1 and 2, in which FIG. 1 is a block diagram of a dimming control system having an asynchronous pulse width modulation mechanism according to first to third embodiments of the present disclosure, and FIG. 2 is a waveform diagram of an asynchronous signal having a fixed frequency and a pulse width modulation signal that are generated by the dimming control system having the asynchronous pulse width modulation mechanism according to the first embodiment of the present disclosure.

The dimming control system of the present disclosure includes a synchronous signal generator circuit 10, a synchronous signal detector circuit 20, a pulse width modulation signal generator circuit 30, a pulse width comparing circuit 40 and a pulse modulation controller circuit 50.

The synchronous signal detector circuit 20 is connected to the synchronous signal generator circuit 10 and the pulse width comparing circuit 40. The pulse width comparing circuit 40 is connected to the pulse width modulation signal generator circuit 30 and the pulse modulation controller circuit 50. The pulse width modulation signal generator circuit 30 is connected to a light-emitting circuit 99.

The synchronous signal generator circuit 10 may output a synchronous signal Sync1 shown in FIG. 2. As shown in FIG. 2, in the first embodiment, a plurality of waveforms of the synchronous signal Sync1 outputted by the synchronous signal generator circuit 10 have the same frequency (such as 60 Hz), but the present disclosure is not limited thereto.

When the synchronous signal generator circuit 10 sequentially outputs the plurality of waveforms of the synchronous signal Sync1, the synchronous signal detector circuit 20 continually detects a level of the synchronous signal Sync1 from the synchronous signal generator circuit 10 to determine a transition in the level of the synchronous signal Sync1. The synchronous signal detector circuit 20 instantly outputs the transition in the level of the synchronous signal Sync1 to the pulse width comparing circuit 40.

The pulse width modulation signal generator circuit 30 sequentially outputs a plurality of pulse waves of a pulse width modulation signal PWM1 as shown in FIG. 2 to the pulse width comparing circuit 40 over time.

In the first embodiment, a time point (of a rising edge) at which each of the plurality of waveforms of the synchronous signal Sync1 transits from a high level to a low level is set as a specified pulse width modulation time point of the pulse width modulation signal PWM1. In the pulse width modulation signal PWM1, widths of some of the plurality of pulse waves that start to be generated from the specified pulse width modulation time point (such as a time point t1 or t2 as shown in FIG. 2) are different from widths of others of the plurality of pulse waves that are generated earlier than the specified pulse width modulation time point.

In other words, when the synchronous signal Sync1 transits from the low level to the high level, the pulse width comparing circuit 40 determines that the transition in the level of the synchronous signal Sync1 meets a specified transition. At this time, the pulse width comparing circuit 40 determines that the current time reaches a time point from which the pulse waves having the modulated widths start being generated in the pulse width modulation signal PWM1.

When the transition in the level of the synchronous signal Sync1 meets the specified transition, the pulse width comparing circuit 40 determines whether or not the width of the pulse wave that is currently generated in the pulse width modulation signal PWM1 reaches a preset pulse width to output a pulse width comparing signal.

The pulse modulation controller circuit 50 may, according to the pulse width comparing signal from the pulse width comparing circuit 40, determine the level and the width of each of the plurality of pulse waves of the pulse width modulation signal PWM1 that are outputted to the light-emitting circuit 99 by the pulse width modulation signal generator circuit 30 for controlling lighting states of one or more light-emitting components (such as, but not limited to light-emitting diodes) included in the light-emitting circuit 99.

For example, when the current time reaches the time point t1 (of the rising edge) at which a second one of the plurality of waveforms of the synchronous signal Sync1 transits from the low level to the high level as shown in FIG. 2, a width of a pulse wave PS11 among the plurality of pulse waves of the pulse width modulation signal PWM1 that is currently constructed by the pulse width modulation signal generator circuit 30 has not reached a preset pulse width yet. At this time, the pulse wave PS11 is an incomplete pulse wave. Under this condition, the pulse modulation controller circuit 50 controls the pulse width modulation signal generator circuit 30 to continually construct the pulse wave PS11 according to the pulse width comparing signal from the pulse width comparing circuit 40. After the width of the pulse wave PS11 reaches the preset pulse width and thus forms a complete pulse wave, the pulse modulation controller circuit 50 controls the pulse width modulation signal generator circuit 30 to sequentially generate subsequent ones of the plurality of pulse waves in the pulse width modulation signal PWM1.

Further, when the current time reaches a time point t2 (of the rising edge) at which a third one of the plurality of waveforms of the synchronous signal Sync1 transits from the low level to the high level (that is the specified transition), a width of a pulse wave PS12 among the plurality of pulse waves of the pulse width modulation signal PWM1 that is currently constructed by the pulse width modulation signal generator circuit 30 has not reached a preset pulse width yet. At this time, the pulse wave PS12 is an incomplete pulse wave. Under this condition, the pulse modulation controller circuit 50 controls the pulse width modulation signal generator circuit 30 to continually construct the pulse wave PS12 according to the pulse width comparing signal from the pulse width comparing circuit 40. After the width of the pulse wave PS12 reaches the preset pulse width and thus forms a complete pulse wave, the pulse modulation controller circuit 50 controls the pulse width modulation signal generator circuit 30 to generate sequentially subsequent ones of the plurality of pulse waves in the pulse width modulation signal PWM1.

As described above, the transition of the synchronization signal Sync1 from the low level to the high level is set as the specified transition. The plurality of pulse waves of the pulse width modulation signal PWM1 are set to be modulated at the time points of the rising edges of the plurality of waveforms of the synchronous signal Sync1, but the present disclosure is not limited thereto.

In practice, the transition of the synchronization signal Sync1 from the high level to the low level may be set as the specified transition. The plurality of pulse waves of the pulse width modulation signal PWM1 are set to be modulated at the time points of falling edges of the plurality of waveforms of the synchronization signal Sync1. Under this condition, when the synchronization signal Sync1 transits from the high level to the low level, the pulse modulation controller circuit 50 determines that the transition in the level of the synchronization signal Sync1 meets the specified transition.

Alternatively, the transitions of the synchronization signal Sync1 from the low level to the high level and from the high level to the low level may be set as the specified transition. The time points (of the rising edge) of the synchronization signal Sync1 transiting from the low level to the high level and the time points of the synchronization signal Sync1 transiting from the high level to the low level (of the falling edge) are set as the specified pulse width modulation time points of the pulse width modulation signal PWM1. Under this condition, when the synchronization signal Sync1 transits from the low level to the high level or from the high level to the low level, the pulse modulation controller circuit 50 determines that the transition in the level of the synchronization signal Sync1 meets the specified transition.

When the transition in the level of the synchronization signal Sync1 (for example, the transition in the rising edges of the second and third ones of the plurality of waveforms of the synchronization signal Sync1) meets the specified transition, the width of the pulse wave that is currently generated in the pulse width modulation signal PWM1 may not have reached the preset pulse width yet. Under this condition, the pulse modulation controller circuit 50 controls the pulse width modulation signal generator circuit 30 to delay generating the subsequent pulse waves of the pulse width modulation signal PWM1 until the width of the pulse wave that is currently generated reaches the preset pulse width.

Conversely, when the transition in the level of the synchronization signal Sync1 meets the specified transition (for example, the transition in a rising edge of a fourth one of the plurality of waveforms of the synchronization signal Sync1 as shown in FIG. 2), the width of the pulse wave that is currently generated in the pulse width modulation signal PWM1 may reach the preset pulse width. Under this condition, the pulse width modulation signal generator circuit 30 does not delay the time points at which the subsequent pulse waves are generated in the pulse width modulation signal PWM1. As shown in FIG. 2, after a working period of one of the plurality of pulse waves of the pulse width modulation signal PWM1 that is aligned with the time point of the rising edge of the fourth one of the plurality of waveforms of the synchronization signal Sync1 ends, the current time reaches a non-working period of the one of the plurality of pulse waves of the pulse width modulation signal PWM1. Then, after the non-working period of the one of the plurality of pulse waves of the pulse width modulation signal PWM1 ends, the current time reaches a working period of a next one of the plurality of pulse waves of the pulse width modulation signal PWM1.

The pulse width modulation signal generator circuit 30 may modulate the preset pulse width of the pulse width modulation signal PWM1 over time as shown in FIG. 2, according to lighting request information of the light-emitting circuit 99 or other information.

A time interval between a transition time point of each one of the plurality of waveforms of the synchronous signal Sync1 (for example, from the low level to the high level) and a transition time point of a next one of the plurality of waveforms of the synchronous signal Sync1 (for example, from the low level to the high level) is defined as a lighting control time interval as described herein.

The pulse width modulation signal generator circuit 30 may set the preset pulse width of the pulse width modulation signal PWM1 to have different values respectively within the plurality of lighting control time intervals. As a result, time lengths that the light-emitting circuit 99 emits light within the plurality of lighting control time intervals, respectively, are different from each other. The time length that the light-emitting circuit 99 emits light within each of the plurality of lighting control time intervals depends on the preset pulse width of the pulse width modulation signal PWM1. In other words, the time length that the light-emitting circuit 99 emits light within each of the plurality of lighting control time intervals depends on a duty cycle of the pulse width modulation signal PWM1.

Figure 3:
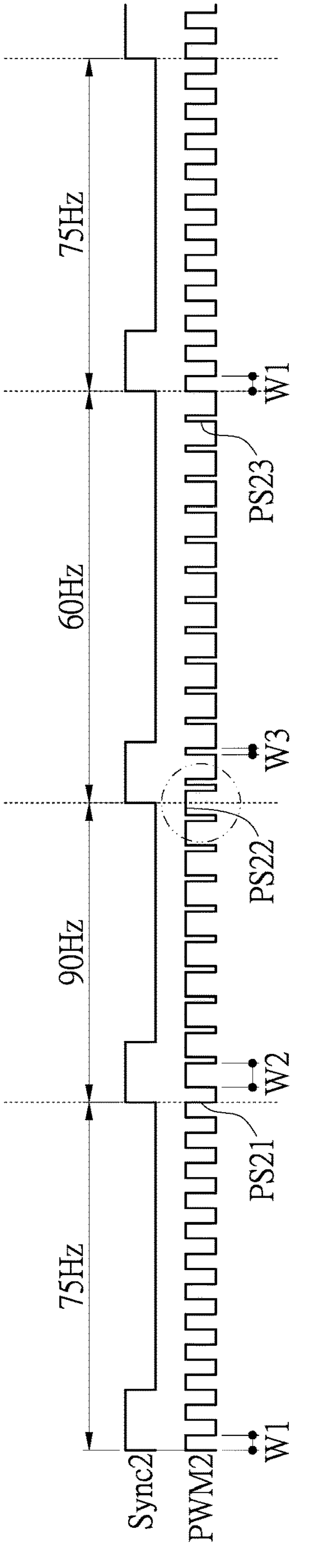
FIG. 3 is a waveform diagram of an asynchronous signal having a frequency that is modulated over time and a pulse width modulation signal that are generated by the dimming control system having the asynchronous pulse width modulation mechanism according to the second embodiment of the present disclosure.
Figure 4:
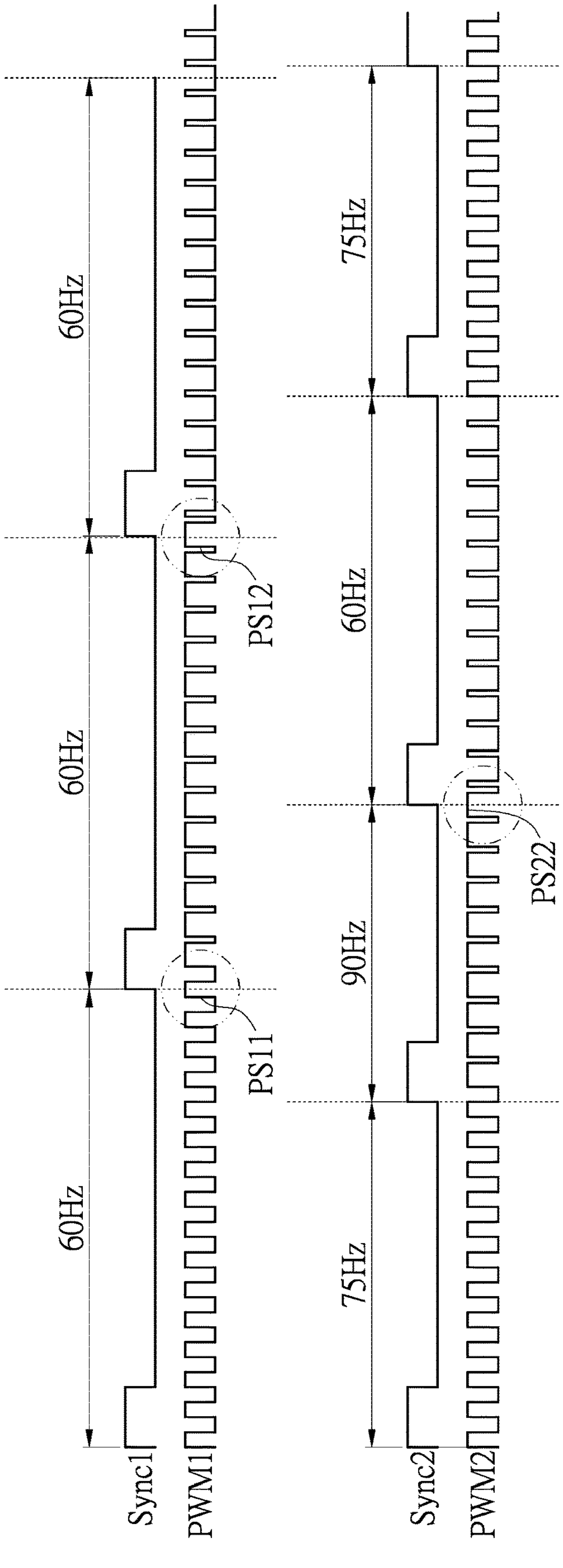
FIG. 4 is a waveform diagram of the asynchronous signal and the pulse width modulation signal that are generated by the dimming control system having the asynchronous pulse width modulation mechanism according to the first and second embodiments of the present disclosure.

Reference is made to FIGS. 3 and 4, in which FIG. 3 is a waveform diagram of an asynchronous signal having a frequency that is modulated over time and a pulse width modulation signal that are generated by the dimming control system having the asynchronous pulse width modulation mechanism according to the second embodiment of the present disclosure, and FIG. 4 is a waveform diagram of the asynchronous signal and the pulse width modulation signal that are generated by the dimming control system having the asynchronous pulse width modulation mechanism according to the first and second embodiments of the present disclosure.

The same or similar descriptions of the first and second embodiments of the present disclosure are not repeated in the following.

In the first embodiment, the plurality of waveforms of the synchronous signal Sync1 outputted by the synchronous signal generator circuit 10 have the same frequency such as 60 Hz as shown in FIGS. 2 and 4. In the second embodiment, a plurality of waveforms of a synchronous signal Sync2 outputted by the synchronous signal generator circuit 10 have different frequencies such as, but not limited to, 75 Hz, 90 Hz, 60 Hz as shown in FIGS. 3 and 4.

As shown in FIGS. 3 and 4, at a time point of a rising edge of a second one of the plurality of waveforms that has the frequency “90 Hz” in the synchronous signal Sync2, a width of a pulse wave PS21 that is currently constructed in a pulse width modulation signal PWM2 by the pulse width modulation signal generator circuit 30 reaches a first preset pulse width W1 that is set within an entire period of a first one of the plurality of waveforms of the synchronous signal Sync2 that has the frequency “75 Hz”. Therefore, the pulse width modulation signal generator circuit 30 transits the pulse wave PS21 of the pulse width modulation signal PWM2 from a high level to a low level. At this time, the pulse wave PS21 has been constructed to form a complete pulse wave. Under this condition, after the time point of the rising edge of the second one of the plurality of waveforms that has the frequency “90 Hz” in the synchronous signal Sync2 and a non-working period of the pulse wave PS21 of the pulse width modulation signal PWM2 end, the pulse width modulation signal generator circuit 30 sequentially constructs a plurality of pulse waves each having a second preset pulse width W2 in the pulse width modulation signal PWM2.

It is worth noting that, at a time point of a rising edge of a third one of the plurality of waveforms (that has the frequency “60 Hz”) of the synchronous signal Sync2, a width of a pulse wave PS22 that is currently constructed in the pulse width modulation signal PWM2 by the pulse width modulation signal generator circuit 30 does not reach the second preset pulse width W2 that is set within an entire period of the second one of the plurality of waveforms (that has the frequency “90 Hz”) in the synchronous signal Sync2. At this time, the pulse width modulation signal generator circuit 30 continually constructs the width of the pulse wave PS22 in the pulse width modulation signal PWM2. After the width of the pulse wave PS22 is constructed to reach the second preset pulse width W2, the pulse width modulation signal generator circuit 30 sequentially constructs a plurality of pulse waves each having a third preset pulse width W3 in the pulse width modulation signal PWM2.

At a time point of a rising edge of a fourth one of the plurality of waveforms (that has the frequency “75 Hz”) in the synchronous signal Sync2, a width of a pulse wave PS23 that is currently constructed in the pulse width modulation signal PWM2 by the pulse width modulation signal generator circuit 30 reaches the third preset pulse width W3 that is set within an entire period of the third one of the plurality of waveforms (that has the frequency “60 Hz”) in the synchronous signal Sync2. At the same time, a non-working period of the pulse wave PS23 of the pulse width modulation signal PWM2 ends. Therefore, at the time point of the rising edge of the fourth one of the plurality of waveforms (that has the frequency “75 Hz”) of the synchronous signal Sync2, the pulse width modulation signal generator circuit 30 generates a next pulse wave having the first preset pulse width W1.

Figure 5:
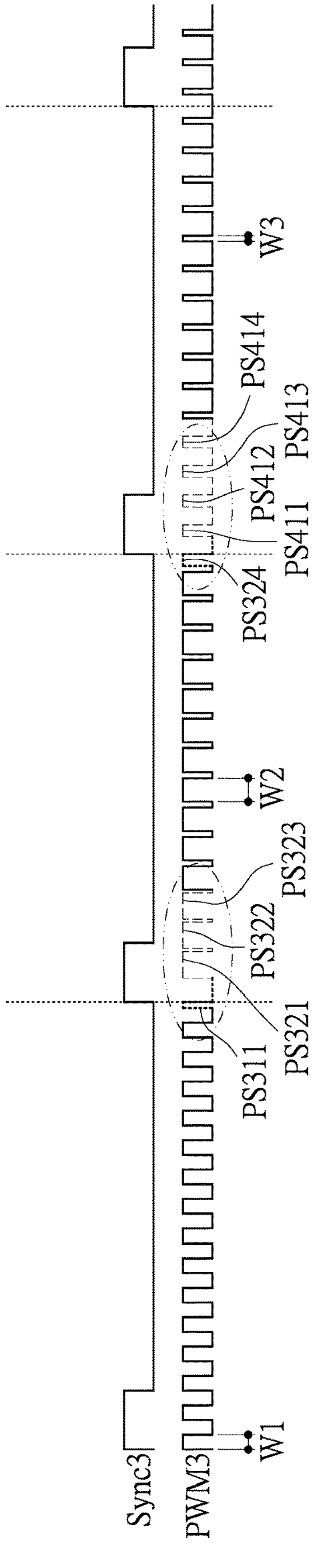
FIG. 5 is a waveform diagram of an asynchronous signal and a pulse width modulation signal that are generated by the dimming control system having the asynchronous pulse width modulation mechanism according to the third embodiment of the present disclosure.
Figure 6:
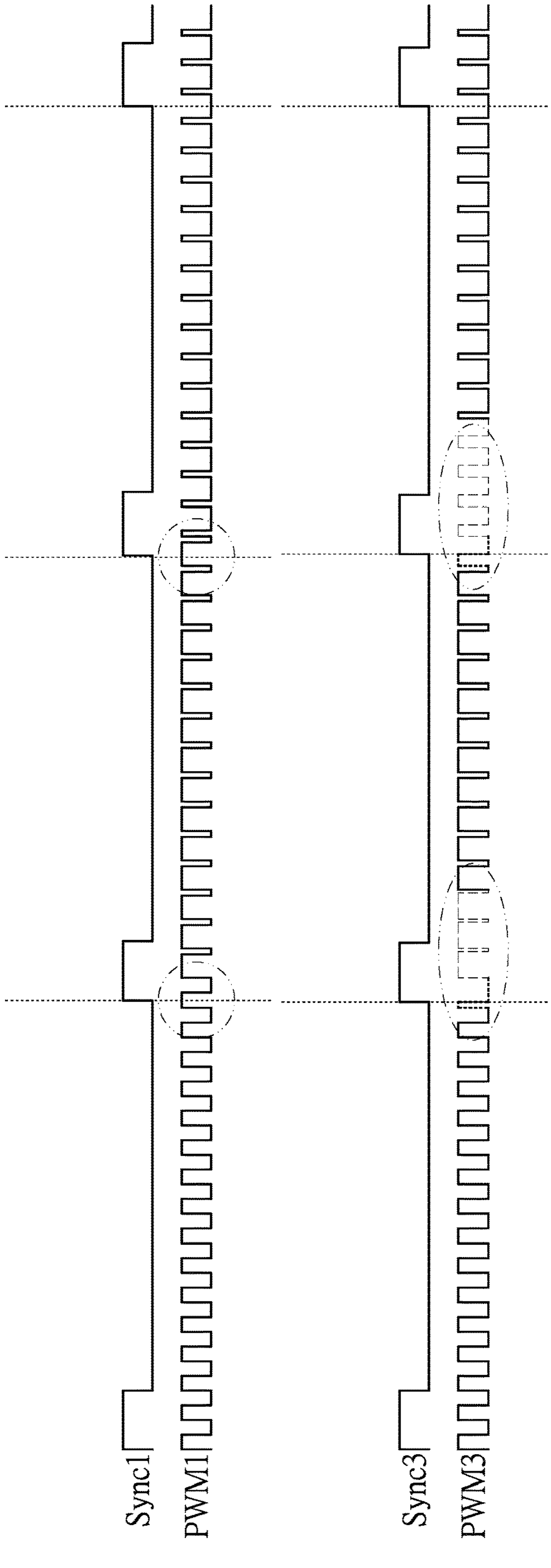
FIG. 6 is a waveform diagram of the asynchronous signal and the pulse width modulation signal that are generated by the dimming control system having the asynchronous pulse width modulation mechanism according to the first and third embodiments of the present disclosure.
Figure 7:
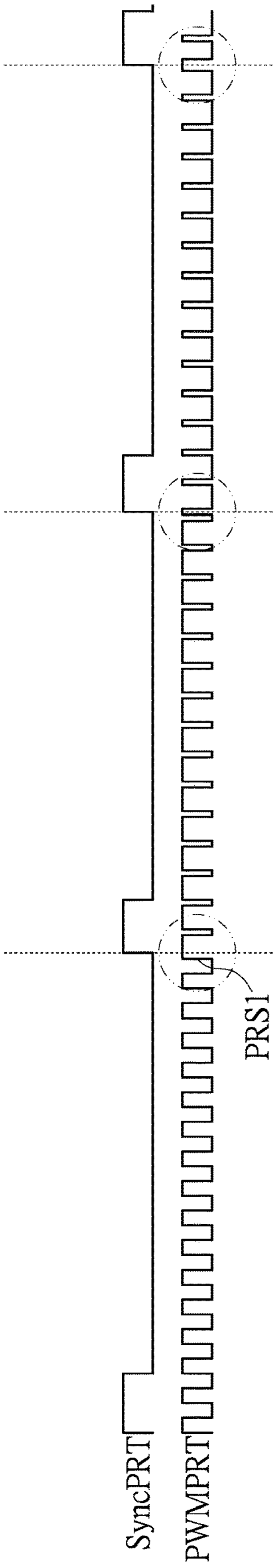
FIG. 7 RELATED ART
FIG. 7 is a waveform diagram of an asynchronous signal and a pulse width modulation signal that are generated by a conventional dimming control system.

Reference is made to FIGS. 5 and 6, in which FIG. 5 is a waveform diagram of an asynchronous signal and a pulse width modulation signal that are generated by the dimming control system having the asynchronous pulse width modulation mechanism according to the third embodiment of the present disclosure, and FIG. 6 is a waveform diagram of the asynchronous signal and the pulse width modulation signal that are generated by the dimming control system having the asynchronous pulse width modulation mechanism according to the first and third embodiments of the present disclosure.

The dimming control system of the present disclosure includes the synchronous signal generator circuit 10, the synchronous signal detector circuit 20, the pulse width modulation signal generator circuit 30, the pulse width comparing circuit 40 and the pulse modulation controller circuit 50.

The synchronous signal detector circuit 20 is connected to the synchronous signal generator circuit 10 and the pulse width comparing circuit 40. The pulse width comparing circuit 40 is connected to the pulse width modulation signal generator circuit 30 and the pulse modulation controller circuit 50. The pulse width modulation signal generator circuit 30 is connected to the light-emitting circuit 99.

As shown in FIGS. 5 and 6, operations performed on a pulse width modulation signal PWM3 by the dimming control system of the third embodiment of the present disclosure are different from operations performed on the pulse width modulation signal PWM1 by the dimming control system of the first embodiment of the present disclosure and operations performed on the pulse width modulation signal PWM2 by the dimming control system of the second embodiment of the present disclosure.

As shown in FIGS. 5 and 6, in the third embodiment, the pulse modulation controller circuit 50 determines that a transition of a second one of a plurality of waveforms of a synchronous signal Sync3 from a low level to a high level meets the specified transition.

However, when the current time reaches a time point at which the second one of the plurality of waveforms of the synchronous signal Sync3 transits from the low level to the high level, a width of a pulse wave PS311 that is currently generated in the pulse width modulation signal PWM3 by the pulse width modulation signal generator circuit 30 does not reach the first preset pulse width W1. Under this condition, the pulse modulation controller circuit 50 controls the pulse width modulation signal generator circuit 30 to forcibly transit the pulse wave PS311 from the high level to the low level to stop increasing the width of the pulse wave PS311. The pulse wave PS311 is maintained as an incomplete pulse wave. A falling edge of the pulse wave PS311 is aligned with a rising edge of the synchronous signal Sync3.

As described above, in the first to third embodiments of the present disclosure, the transition of the synchronization signal from the low level to the high level is set as the specified transition, and the plurality of pulse waves of the pulse width modulation signal are modulated at the time points (of the rising edges) of the plurality of waveforms of the synchronous signal transit from the low level to the high level. In practice, the transition of the synchronization signal from the high level to the low level (and from the low level to the high level) may be set as the specified transition. In practice, the falling edge of the incomplete pulse wave of the pulse width modulation signal may also be aligned with a falling edge of the synchronous signal.

It is worth noting that, after the pulse width modulation signal generator circuit 30 outputs the pulse wave PS311 that is the incomplete pulse wave, the pulse modulation controller circuit 50 controls the pulse width modulation signal generator circuit 30 to modulate widths of N subsequent pulse waves (such as, but not limited to three pulse waves PS321, PS322, PS323 as shown in FIG. 5) to increase the widths of the N subsequent pulse waves (to be larger than the second preset pulse width W2). As a result, the pulse width modulation signal PWM3 is compensated.

In detail, the pulse width comparing circuit 40 may calculate a difference between the first preset pulse width W1 and the pulse wave PS311 that is the incomplete pulse wave of the pulse width modulation signal PWM3. The pulse modulation controller circuit 50, according to the difference from the pulse width comparing circuit 40, determines the pulse width modulation signal generator circuit 30 to modulate by how much (N) subsequent pulse waves that are generated later than the incomplete pulse wave in the pulse width modulation signal PWM3, and determines target widths of the modulated pulse waves of the pulse width modulation signal PWM3.

By the pulse width modulation signal generator circuit 30, working periods of the N pulse waves that are generated later than the incomplete pulse wave in the pulse width modulation signal PWM3 are increased with an increase in the widths of the N pulse waves. At the same time, the pulse width modulation signal generator circuit 30 may modulate non-working periods of the N pulse waves the pulse width modulation signal PWM3 to decrease the non-working periods of the N pulse waves the pulse width modulation signal PWM3. As a result, an entire period and a frequency of each of the N pulse waves of the pulse width modulation signal PWM3 is not changed.

The transition of a third one of the plurality of waveforms of the synchronous signal Sync3 transits from the low level to the high level meets the specified transition. When the current time reaches the time point at which the third one of the plurality of waveforms of the synchronous signal Sync3 transits from the low level to the high level, a width of a pulse wave PS324 that is currently generated in the pulse width modulation signal PWM3 by the pulse width modulation signal generator circuit 30 does not reach the second preset pulse width W2. Under this condition, the pulse modulation controller circuit 50 controls the pulse width modulation signal generator circuit 30 to forcibly transit the pulse wave PS324 from the high level to the low level to stop increasing the width of the pulse wave PS324. The pulse wave PS324 is maintained as an incomplete pulse wave.

It is worth noting that, after the pulse width modulation signal generator circuit 30 outputs the pulse wave PS324 of the pulse width modulation signal PWM3, the pulse modulation controller circuit 50 controls the pulse width modulation signal generator circuit 30 to modulate widths of M pulse waves that are generated later than the pulse wave PS324 in the pulse width modulation signal PWM3 to increase the widths of the M pulse waves (to be larger than the third preset pulse width W3). For example, the modulated M pulse waves are four pulse waves PS411, PS412, PS413, PS414 as shown in FIG. 5, but the present disclosure is not limited thereto. As a result, the pulse width modulation signal PWM3 is compensated.

In conclusion, the present disclosure provides the dimming control system having the asynchronous pulse width modulation mechanism. Each time when the transition in the level of the synchronous signal meets the specified transition (for example, from the low level to the high level), a time point at which the lighting state of the light-emitting circuit is adjusted is reached. At this time, the dimming control system of the present disclosure appropriately modulates the widths of the pulse waves of the pulse width modulation signal to prevent unexpected conditions such as abnormal flashing from occurring in the light-emitting circuit that operates according to the pulse width modulation signal.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dimming control system having an asynchronous pulse width modulation mechanism, comprising:

a synchronous signal generator circuit configured to output a synchronous signal;

a synchronous signal detector circuit connected to the synchronous signal generator circuit, and configured to detect a level of the synchronous signal from the synchronous signal generator circuit;

a pulse width modulation signal generator circuit configured to sequentially output a plurality of pulse waves of a pulse width modulation signal over time;

a pulse width comparing circuit connected to the synchronous signal detector circuit and the pulse width modulation signal generator circuit, wherein the pulse width comparing circuit determines whether or not a width of one of the plurality of pulse waves of the pulse width modulation signal that is generated when a transition in the level of the synchronous signal meets a specified transition reaches a preset pulse width to output a pulse width comparing signal; and a pulse modulation controller circuit connected to the pulse width modulation signal generator circuit and the pulse width comparing circuit, wherein the pulse modulation controller circuit determines a level and a width of each of the plurality of pulse waves of the pulse width modulation signal for controlling a lighting state of a light-emitting circuit according to the pulse width comparing signal from the pulse width comparing circuit, and the pulse width modulation signal generator circuit outputs the pulse width modulation signal to the light-emitting circuit connected thereto;

wherein, when the transition in the level of the synchronous signal meets the specified transition and the width of the one of the plurality of pulse waves that is currently generated in the pulse width modulation signal has yet to reach the preset pulse width, the pulse modulation controller circuit controls the pulse width modulation signal generator circuit to delay generating subsequent ones of the plurality of pulse waves of the pulse width modulation signal until the width of the one of the plurality of pulse waves reaches the preset pulse width.

2. The dimming control system according to claim 1, wherein, when the synchronous signal transits from a low level to a high level, the pulse modulation controller circuit determines that the transition in the level of the synchronous signal meets the specified transition.

3. The dimming control system according to claim 1, wherein, when the synchronous signal transits from a high level to a low level, the pulse modulation controller circuit determines that the transition in the level of the synchronous signal meets the specified transition.

4. The dimming control system according to claim 1, wherein, when the synchronous signal transits from a low level to a high level or from the high level to the low level, the pulse modulation controller circuit determines that the transition in the level of the synchronous signal meets the specified transition.

5. The dimming control system according to claim 1, wherein the pulse width modulation signal generator circuit generates the plurality of pulse waves of the pulse width modulation signal respectively within a plurality of time intervals, the pulse width modulation signal generator circuit adjusts the preset pulse width over time according to lighting request information of the light-emitting circuit such that the preset pulse width has different values respectively within the plurality of time intervals, and each of the plurality of pulse waves of the pulse width modulation signal and the preset pulse width that are generated within a same one of the plurality of time intervals are compared with each other by the pulse width comparing circuit.

6. The dimming control system according to claim 1, wherein the synchronous signal generator circuit generates a plurality of waveforms having different frequencies in the synchronous signal according to lighting request information of the light-emitting circuit.

7. The dimming control system according to claim 1, wherein the pulse width modulation signal generator circuit sets the preset pulse width to have different values respectively within a plurality of lighting control time intervals, and each of the plurality of lighting control time intervals is between a transition time point of one of a plurality of waveforms of the synchronous signal and a transition time point of a next one of the plurality of waveforms of the synchronous signal.

8. The dimming control system according to claim 7, wherein, when a current time falls within one of the plurality of lighting control time intervals and a width of one of the plurality of pulse waves of the pulse width modulation signal that starts being increased from a previous one of the plurality of lighting control time intervals does not reach the preset pulse wave of the previous one of the plurality of lighting control time intervals, the pulse width modulation signal generator circuit continually increases the width of the one of the plurality of pulse waves until reaching the preset pulse wave of the previous one of the plurality of lighting control time intervals.

9. A dimming control system having an asynchronous pulse width modulation mechanism, comprising:

a synchronous signal generator circuit configured to output a synchronous signal;

a synchronous signal detector circuit connected to the synchronous signal generator circuit, and configured to detect a level of the synchronous signal from the synchronous signal generator circuit;

a pulse width modulation signal generator circuit configured to sequentially output a plurality of pulse waves of a pulse width modulation signal over time;

a pulse width comparing circuit connected to the synchronous signal detector circuit and the pulse width modulation signal generator circuit, wherein the pulse width comparing circuit determines whether or not a width of one of the plurality of pulse waves of the pulse width modulation signal that is generated when a transition in the level of the synchronous signal meets a specified transition reaches a preset pulse width to output a pulse width comparing signal; and a pulse modulation controller circuit connected to the pulse width modulation signal generator circuit and the pulse width comparing circuit, wherein the pulse modulation controller circuit determines a level and a width of each of the plurality of pulse waves of the pulse width modulation signal for controlling a lighting state of a light-emitting circuit according to the pulse width comparing signal, and the pulse width modulation signal generator circuit outputs the pulse width modulation signal to the light-emitting circuit connected thereto;

wherein, when the transition in the level of the synchronous signal meets the specified transition and the width of the one of the plurality of pulse waves that is currently generated in the pulse width modulation signal has not reached the preset pulse width yet, the pulse modulation controller circuit controls the pulse width modulation signal generator circuit to forcibly transit the one of the plurality of pulse waves from a high level to a low level so as to stop increasing the width of the one of the plurality of pulse waves, to maintain the one of the plurality of pulse waves as an incomplete pulse wave, and to modulate the widths of one or more subsequent ones of the plurality of pulse waves of the pulse width modulation signal to be larger than the preset pulse width of the one or more subsequent ones of the plurality of pulse waves.

10. The dimming control system according to claim 9, wherein, when the synchronous signal transits from a low level to a high level, the pulse modulation controller circuit determines that the transition in the level of the synchronous signal meets the specified transition.

11. The dimming control system according to claim 9, wherein, when the synchronous signal transits from a high level to a low level, the pulse modulation controller circuit determines that the transition in the level of the synchronous signal meets the specified transition.

12. The dimming control system according to claim 9, wherein, when the synchronous signal transits from a low level to a high level or from the high level to the low level, the pulse modulation controller circuit determines that the transition in the level of the synchronous signal meets the specified transition.

13. The dimming control system according to claim 9, wherein the synchronous signal generator circuit generates a plurality of waveforms having different frequencies in the synchronous signal according to lighting request information of the light-emitting circuit.

14. The dimming control system according to claim 9, wherein the pulse width modulation signal generator circuit generates the plurality of pulse waves of the pulse width modulation signal respectively within a plurality of time intervals, the pulse width modulation signal generator circuit adjusts the preset pulse width over time such that the preset pulse width has different values respectively within the plurality of time intervals according to lighting request information of the light-emitting circuit, and each of the plurality of pulse waves of the pulse width modulation signal and the preset pulse width that are generated within a same one of the plurality of time intervals are compared with each other by the pulse width comparing circuit.

15. The dimming control system according to claim 9, wherein the pulse width comparing circuit calculates a difference between the width of the incomplete pulse wave of the pulse width modulation signal and the preset pulse width, and the pulse modulation controller circuit accordingly determines to control the synchronous signal generator circuit to modulate which one or more of the plurality of pulse waves that are generated later than the incomplete pulse wave in the pulse width modulation signal, and determines target widths of the one or more of the plurality of pulse waves.

16. The dimming control system according to claim 9, wherein the pulse modulation controller circuit controls the synchronous signal generator circuit to modulate working periods of one or more of the plurality of pulse waves that are generated later than the incomplete pulse wave in the pulse width modulation signal to be larger than a preset working period, and to reduce non-working periods of the one or more of the pulse waves, such that each of frequencies of the one or more of the plurality of pulse waves is equal to a preset frequency.

17. The dimming control system according to claim 9, wherein the pulse width modulation signal generator circuit sets the preset pulse width to have different values respectively within a plurality of lighting control time intervals according to lighting request information of the light-emitting circuit, and each of the plurality of lighting control time intervals is between a transition time point of one of a plurality of waveforms of the synchronous signal and a transition time point of a next one of the plurality of waveforms of the synchronous signal.

18. The dimming control system according to claim 9, wherein a falling edge of the incomplete pulse wave of the pulse width modulation signal is aligned with a rising edge of one of a plurality of waveforms of the synchronous signal.

19. The dimming control system according to claim 9, wherein a falling edge of the incomplete pulse wave of the pulse width modulation signal is aligned with a falling edge of one of a plurality of waveforms of the synchronous signal.

20. The dimming control system according to claim 9, wherein a falling edge of the incomplete pulse wave of the pulse width modulation signal is aligned with a rising edge or a falling edge of one of a plurality of waveforms of the synchronous signal.

* * * * *